United States Patent [19]

Schier et al.

[11] Patent Number: 4,470,607

[45] Date of Patent: Sep. 11, 1984

[54] APPARATUS FOR SEALING A HIGH PRESSURE INSTALLATION INCLUDING A MOVABLE MEMBER, ESPECIALLY AN OSCILLATORY MOVABLE PLUNGER OR A ROTARY SHAFT

[75] Inventors: Walter Schier, Bruck an der Mur; Gerald Retschnik, Niklasdorf, both of Austria

[73] Assignee: Vereinigte Edelstahlwerke Aktiengesellschaft (VEW), Vienna, Austria

[21] Appl. No.: 551,553

[22] Filed: Nov. 14, 1983

[30] Foreign Application Priority Data

Nov. 26, 1982 [AT] Austria .................................. 4309/82

[51] Int. Cl.³ .............................................. F16J 15/24
[52] U.S. Cl. ..................................... 277/117; 277/77; 277/119; 277/123
[58] Field of Search ............. 277/70, 77, 79, 123–125, 277/117–119, 188 R, 188 A

[56] References Cited

U.S. PATENT DOCUMENTS

| | | | |
|---|---|---|---|
| 3,068,017 | 12/1962 | Prosser | 277/117 |
| 3,834,715 | 9/1974 | Butler . | |
| 3,865,387 | 2/1975 | Larker et al. | 277/117 X |
| 4,192,519 | 3/1980 | Buggele | 277/125 X |
| 4,288,082 | 9/1981 | Setterberg | 277/125 |

FOREIGN PATENT DOCUMENTS

| | | |
|---|---|---|
| 296700 | 2/1972 | Austria . |
| 2204162 | 8/1973 | Fed. Rep. of Germany . |
| 2336118 | 11/1976 | Fed. Rep. of Germany . |
| 2165340 | 7/1973 | France . |
| 158480 | 2/1921 | United Kingdom ................. 277/117 |
| 1103013 | 9/1966 | United Kingdom . |

Primary Examiner—Robert S. Ward
Attorney, Agent, or Firm—Werner W. Kleeman

[57] ABSTRACT

The apparatus for sealing a movable member with respect to a liquid medium, especially an oscillatory movable plunger or a rotary shaft within the bore of a high pressure installation comprises an intermediate sleeve, a ring member, and a bushing which are successively arranged with respect to a pressure space or chamber and which are axially biased towards the pressure space by a pressure sleeve. On the side remote from the pressure space the ring member is provided with a recess in the shape of a truncated cone or pyramid. On the side facing the ring member the bushing is formed with a protrusion possessing a complementary truncated cone or pyramid shape. A support ring may be arranged between adjacent surfaces of the ring member and the bushing. On the side facing the intermediate sleeve the ring member has a section of reduced diameter surrounded by a biasing ring subjecting the ring member to a radial force directed towards the movable member. In a transitional region between the section of smaller diameter and the remaining portion of the ring member there may also be provided a support ring. The ring member also may have the form of a sealing collar with a V-shaped cross-section and at both end faces there are arranged support rings.

52 Claims, 2 Drawing Figures

APPARATUS FOR SEALING A HIGH PRESSURE INSTALLATION INCLUDING A MOVABLE MEMBER, ESPECIALLY AN OSCILLATORY MOVABLE PLUNGER OR A ROTARY SHAFT

BACKGROUND OF THE INVENTION

The present invention broadly relates to a new and improved apparatus for sealing high pressure installations with respect to a liquid medium.

In its more specific aspects the invention relates to a new and improved apparatus for sealing a high pressure installation containing a movable member with respect to a liquid medium within a pressure space or chamber which is to be sealed. The movable member may be, for example, an oscillatory movable plunger or displacement piston in a high pressure pump or a rotary movable shaft in a high pressure apparatus.

A known high-pressure sealing apparatus or device for the displacement pistons of piston pumps is formed by a metallic sleeve surrounding the displacement piston located in a bore of the pump head in spaced relationship from the wall of the bore in the pump head. The metallic sleeve comprises, at the low-pressure end thereof, a guiding flange situated within a bore which is cut or machined into the pump head and which is enlarged as compared to the pump head bore.

At high pressures in the range of several thousand bar, as required particularly in the case of pumps for fluid-jet operated cutting installations, the known high-pressure clearance seal has been found to be insufficient. The clearance sleeve comprises sections of different material thickness, so that, particularly in the case of strongly fluctuating pressure loads, material failures can occur. In addition, the service life of the known seals is unsatisfactory.

A high-pressure piston sealing apparatus as known, for example, from German Pat. No. 2,336,118, acts on the basis of a labyrinth seal. The labyrinth seal is formed by at least one sealing body which is structured as a sealing sleeve containing a labyrinth section and floatingly arranged on the piston. Apart from the expensive manufacture of the labyrinth arrangement such a seal has the disadvantage that it possesses an increased assembly length. Also, due to the great number of labyrinth tips which bear upon the piston, there is present a relatively high wear.

Furthermore, there are known high-pressure seals for the displacement pistons of piston pumps and pressure transmitters, wherein the sealing action is effected by means of a sealing ring made of a soft material and snugly fitted to the moved plunger due to the tensioning of an O-ring.

With respect to the encountered pressures the service life of the aforementioned known seal is unsatisfactory, since there is present relatively high wear due to the unavoidable formation of a gap or space between the plunger and the so-called back-ring or support ring of the sealing ring.

SUMMARY OF THE INVENTION

Therefore, with the foregoing in mind it is a primary object of the present invention to provide a new and improved sealing apparatus or sealing arrangement for sealing a high pressure installation equipped with a movable member, especially, although not exclusively, an oscillatory movable plunger or a rotary shaft, with respect to a liquid medium, especially also non-lubricating liquids or liquid media.

Another important object of the present invention is directed to the provision of a new and improved apparatus for sealing a high pressure installation containing a movable member, especially an oscillatory movable plunger or a rotary shaft, with respect to a liquid medium, and which comprises only a small number of individual parts yet provides an extremely reliable sealing action.

Still a further significant object of the present invention is directed to a new and improved sealing apparatus for sealing a high pressure installation including a movable member, especially an oscillatory movable plunger or a rotary shaft, with respect to a liquid medium, which sealing apparatus operates at low wear and possesses a high service life.

Another, still important object of the present invention is directed to a new and improved apparatus for sealing a high pressure installation containing a movable member, especially an oscillatory movable plunger or a rotary shaft, with respect to a liquid medium, wherein the danger of material failures is practically excluded.

Now in order to implement these and still further objects of the invention, which will become more readily apparent as the description proceeds, the sealing apparatus of the present development is manifested by the features that, a ring member, preferably made of a plastically and/or elastically deformable material can be subjected, particularly by means of a biasing ring, to forces which are directed substantially radially towards the lengthwise axis of the plunger or shaft. The ring member is provided at the end remote from the pressure space or chamber to be sealed, particularly at an annular or ring-shaped end face thereof, a recess substantially possessing the shape of a truncated cone or pyramid. A bushing or sleeve member is arranged on the side of the ring member located remote from the pressure space or chamber and is provided with a truncated-conical or truncated-pyramid shaped protrusion or projection 13 substantially corresponding to the shape of the aforementioned recess. This recess defines a wall and the protrusion defines an outer surface. The outer surface of the protrusion at least partially engages with the wall of the recess.

Thus, there has been devised a high-pressure sealing apparatus possessing substantially smaller assembly lengths and an improved sealing action in comparison to the aforementioned state-of-the-art conical clearance seals and which are designed in such a manner that the pressure prevailing within the installation to be sealed itself augments the sealing action.

In the new and improved sealing apparatus according to the invention the ring or ring member predominantly performs a sealing function, especially a pressure or force transmitting function, while sealing and plunger or shaft guiding functions are assigned to the bushing or sleeve member. It is thus possible to reduce the leakage which, above all, depends upon the clearance width to a tolerable degree or even to zero at high pressures provided that the combination of the materials forming the ring member, bushing and plunger permits a zero clearance without resulting in pronounced rubbing action. It is a further advantage of the interengaging conical shapes or tapers of the recess at the ring member and the protrusion or projection at the bushing sleeve member that the sealing lip formed at the sealing and guiding bushing or sleeve member can be centered relative to the plunger or the shaft. Hence, even small movements of the plunger can be compensated by the sealing lip present at the protrusion, so that even in such case there is maintained the clearance width which must be kept extremely small.

It has been found that upon installation or fitting of the inventive high-pressure sealing in its related installation or apparatus the service life of such high-pressure installations or the like can be substantially increased.

During the pressure stroke of the plunger a pressure is built-up on the side of the sealing ring member which faces the pressure space or chamber, in the fluid medium which is present in the small clearance or space between the plunger and the wall of the bore or the internal surface of an intermediate sleeve inserted into the bore. Such pressure exerts a force upon the ring member which is substantially axially directed and away from the pressure space or chamber. The wall of the recess in the end face of the ring member which faces the bushing or sleeve member is shaped substantially like a truncated cone or pyramid and is axially pressed against the outer surface of the protrusion or projection at the bushing, the shape of which corresponds to that of the recess. Due to the inclined design of the two coacting walls of the ring member and bushing the axial force which is transmitted from the ring member to the bushing is partially transformed at the region of the protrusion at the bushing into a force component which is radially inwardly directed towards the lengthwise axis of the plunger or the like. Due to the action of this force component the marginal region of the conical or pyramid configured protrusion at the bushing is pressed against the outer surface of the slidingly throughpassing plunger or shaft surrounded thereby. In this way there is formed at the aforementioned marginal regions of the protrusion at the bushing a type of sealing lip and the clearance or space between the inner space of the bushing and the outer surface of the plunger or shaft is automatically adjusted to practically zero. In this manner the bushing or sleeve member not only functions to guide the plunger but additionally carries out a sealing function at least at the region of its protrusion, particularly in the marginal or edge region thereof.

It is remarked at this point that the sealing action described hereinbefore is also obtained at rotating shafts. In that case the hollow space or chamber to be sealed is practically always pressurized, so that the axial force acting upon the ring member continuously is present. This force is used to increase the sealing action by incorporating the bushing or sleeve member as a sealing element in the inventive sealing apparatus. The ring member is substantially spared from wear because the bushing participates in part of the sealing function in the inventive sealing apparatus.

When the movement of the plunger is reversed, i.e. during the suction stroke, the pressure prevailing in the bore of the high-pressure space or chamber is reduced. The axial compression force of the ring member exerted on the protrusion at the bushing and, thus, the affect of the radial force thereof upon the outer surface of the plunger, and furthermore, also the aforementioned sealing action of the sealing lip is reduced, and the sealing lip formed at the protrusion of the bushing during the pressure stroke is re-opened. The outer surface of the plunger is thus hardly contacted during the suction stroke, and thus, is only subjected to extremely slight wear.

According to one advantageous embodiment of the inventive sealing apparatus the ring member and the bushing or sleeve member are arranged in a widened section intended to accommodate the ring member and the bushing or sleeve. This widened section is part of the bore of the high-pressure installation through which the plunger or the shaft extends. When the bore in the high-pressure installation is designed such that the plunger or the shaft are directly slidingly mounted therein without the arrangement of a guiding intermediate sleeve, then the aforementioned widened section is provided in that region of the bore located remote from the high-pressure space or chamber and which is outwardly directed. The inventive sealing apparatus is arranged in this region of the bore. In the presence of such a widened section or region the transition from the bore to its widened section is structured like a step which is then followed by the ring member retained in its position by the bushing. The bushing or sleeve member, in turn, is retained in position by means of a pressure or pressing sleeve releasably arranged on the outer side of the high-pressure installation. In this arrangement the ring member is pressed against the step through the intermediary action of the bushing and the pressing sleeve.

However, a design is preferred in which a bore of essentially uniform diameter is provided in which a guiding intermediate sleeve is placed, in order to support the plunger or shaft guided thereby. In this case there is again provided a region on the side of the high-pressure installation located remote from the pressure space or chamber and into which the guiding or intermediate sleeve does not extend. At this section of the bore which is held free there is sufficient space for the arrangement of the inventive sealing apparatus.

Preferably an intermediate bushing or sleeve is placed in the bore of the high-pressure installation and surrounds the plunger or shaft, and the ring member is arranged in the direction of the pressure space or chamber so as to be spaced from a preferably planar end face of the intermediate sleeve located remote from such pressure space. Such design favors the exchange of members in case of wear and has the particular advantage that no abrupt changes in cross-section or material thickness are present in the bore which, like the pressure space, is subjected to high pressure. By virtue of such construction the strength of the entire installation is increased.

The total distance or spacing between the end face of the guiding or guide sleeve and the ring member, for example, may amount to one millimeter or less. Due to the free space which is thus formed pressurized medium located therein can subject the ring member to an outwardly directed axial force from the region of such free space, and thus, presses the ring member solidly against the conical protrusion of the bushing or sleeve member.

In the last-described embodiment of the inventive sealing apparatus including an intermediate sleeve in the bore, a modification has been found to be advantageous in which the bushing or sleeve member having the protrusion protruding into the recess of the ring member is retained in position by a pressure or pressing sleeve, which, in turn, is preferably held by a releasable holding element. If desired, the bushing can be pressed in the direction of the end face of the intermediate sleeve arranged within the bore by a force which is substantially axially directed towards the pressure space or chamber. In such an arrangement a precisely matched counter-compression or pressing of the ring member against the wall of the bore, on the one hand, and against the surface of the plunger or shaft, on the other hand, is achieved by means of the aforementioned pressure or pressing sleeve.

Preferably, the aperture or apex angle α of the truncated-conical or truncated-pyramid shaped recess at the ring member and the aperture or apex angle β of the complementary shaped protrusion or projection which substantially fits into such recess and which is formed at the bushing or sleeve member each lie in the range of 30° to 60°, particularly amount to about 45°.

There may be further provided an arrangement wherein the recess and the protrusion, i.e. the truncated-conical or truncated-pyramid shaped sections which fit into each other, have the same apex or aperture angles α and β. A uniform transfer of the axial force from the sealing ring member to the protrusion is thus obtained and there is enlarged in longitudinal direction the region of the "lip" sealing action.

According to a further variant of the inventive sealing apparatus the apex angle α of the truncated-conical or truncated-pyramid shaped recess at the ring member is designed to be greater than the apex angle β of the substantially correspondingly shaped protrusion at the bushing or sleeve member. Preferably, the difference is in the range of 1° to 5°. Due to the different inclination of the abutting surfaces of the recess at the ring member and the protrusion at the bushing the front portion of the protrusion which faces the ring member is pressed against the plunger surface with a substantially greater force than the contiguous sections of the protrusion. There is thus obtained a continuous drop in the action of force towards the outside. The modification including different apex angles as described hereinbefore is particularly suited for the sealing of rotating shafts. Advantageously, the material from which the ring member is made is a synthetic material and polymers based on tetrafluorethylene are particularly preferred. However, other polymers can also be used, such as those on the basis of possibly fluorinated polyalkalines, particularly such as those formed from a polytetrafluoroethylene compound material. Plastics and particularly fluorinated polyethylenes have the advantage of possessing a very small coefficient of friction, so that even when relatively high compression forces are effective at the plunger or the shaft to be sealed, the wear of the ring member in the inventive sealing apparatus still can be maintained at an extremely small level.

For particularly obtaining a positive high-pressure sealing action at the wall of the bore or at a widened section of the bore in the high-pressure installation, on the one hand, and also for providing a good supporting action for the ring member, on the other hand, it is advantageous to use a support ring, preferably made of metal, particularly steel. This support ring preferably has a substantially triangular cross-section and is arranged at the annular end face of the ring member containing the recess. This support ring continues the conically-shaped contour of the recess substantially up to the marginal region of the ring member. Such support ring also particularly serves to safely prevent creeping out of the ring member in the event of possibly occurring extremely high pressure loads.

Advantageously, the ring member further contains at its side facing the pressure space or chamber a section of smaller diameter which is surrounded by a biasing or loading ring, especially an O-ring. This section of smaller diameter is subjected to a force directed substantially radially towards the lengthwise axis of the plunger or shaft. The aforementioned section of smaller diameter serves to accommodate the biasing ring or the like which, in turn, ensures that the internal surface of the ring member engages with the outer surface of the piston, plunger or shaft to be sealed due to the radial forces originating from such biasing ring.

In a particularly preferred modification of the embodiment as just-described hereinbefore, the smaller diameter section at the ring member is designed to change over into the section of the ring member, the outer diameter of which substantially corresponds to the inner diameter of the bore in the high-pressure installation, through a transitional section or region of substantially truncated-conical or truncated-pyramid shape. If desired, the transitional section can be surrounded by a further support ring, preferably made of metal. Such a transitional section between the ring section of smaller outer diameter and the section of the ring having an outer diameter substantially corresponding to the diameter of the bore in the high-pressure installation, has the advantage that there is no abrupt transition from one material thickness to another in the ring member. The just-described further support ring, which preferably is made of metal, particularly steel, serves to prevent the ring member from creeping out; however, this further support ring can also be omitted as practice has shown.

It is here mentioned that the support rings as described hereinbefore are also termed "chambering rings" and have been described, for example, in Austrian Pat. No. 296,700.

A further design of the sealing apparatus according to the invention has proven advantageous. Here the ring member is not specifically subjected to a force like the one generated, for example, by the above-mentioned O-ring and directed towards the plunger axis. In such further design now to be described, the ring member substantially forms a possibly multi-membered sealing collar possibly forming a multi-membered ring of substantially V-shaped cross-section. The end of the ring member which faces the bushing or sleeve member is designed as a truncated cone or pyramid containing the truncated-conical or truncated-pyramid recess. Preferably, a possibly multi-membered support ring is arranged between the outer surface of the ring member facing the bushing or sleeve member and the outer surface of the protrusion or projection at the bushing. In addition to, or in place of this support ring, a further possibly multi-membered support ring can be arranged on the side of the ring member which faces the pressure space or chamber.

With respect to the material of the bushing or sleeve member the same is preferably made of steel or a copper beryllium alloy, particularly for reasons of the required mechanical strength and low wear.

Advantageously, the length of the bushing or sleeve member is equal to or greater than the outer diameter thereof. If the bushing is formed too short, then such bushing cannot optimally comply with its guiding function under certain conditions.

In case that in addition to the above-mentioned "lip" sealing action, a good sealing is also required towards the exterior, it can be advantageous for the bushing or sleeve member to comprise, on its internal surface facing the plunger or shaft, grooves which extend substantially transversely relative to the bushing axis and which preferably have an approximately semi-circular or U-shaped cross-section.

Towards the external side or outside the inventive sealing apparatus is advantageously designed such that the pressure or pressing sleeve retaining the sealing apparatus in position comprises sealing means, preferably formed by at least one sealing lip and/or at least one O-ring arranged at the internal or inner surface of the pressing sleeve facing the plunger or shaft. The sealing means at the internal side of the pressing sleeve additionally increases the leakage-safety of the apparatus.

Advantageously, there can be further provided, particularly for obtaining good lubrication of the surfaces between the pressing sleeve and the plunger or shaft, lubricant-supply passages which possibly may serve as leakage-discharge passages which are arranged in the pressing sleeve and open at the internal or inner surface thereof facing the plunger or shaft. The leakage-discharge passages serve to conduct away in an intended manner the leakage medium.

Such lubricant-supply passages also can be provided in the bushing or sleeve member which has been described in detail hereinbefore.

It is here still further noted with respect to the inventive sealing apparatus that the same enables substantially reducing the wear of the ring member in the presence of an increased sealing effect, and thus, to increase the service life of the sealing apparatus by a multiple in comparison to heretofore known sealing arrangements. Due to the short installation length of the inventive sealing apparatus also no substantial heating arises during the operation of the plunger or shaft, since there is ensured good heat removal by the medium.

In a test arrangement a sealing apparatus designed according to the invention and comprising a ring member provided with a biasing ring and a bushing or sleeve member was tested at a pressure of 4000 bar in a double-acting plunger pump intended for use in a high-pressure cutting device with water serving as the liquid medium.

The following materials were used:
plunger: hard metal
bushing: copper beryllium alloy
ring member: polytetrafluorethylene compound material
support or "chambering" rings: stainless steel.

It has been found that even when working with water pressures in a range up to 5000 bar such could be controlled when using the inventive sealing apparatus.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components, and wherein.

DETAILED DESCRIPTION OF THE PREFERRED EMBODIMENTS

Figure 1:
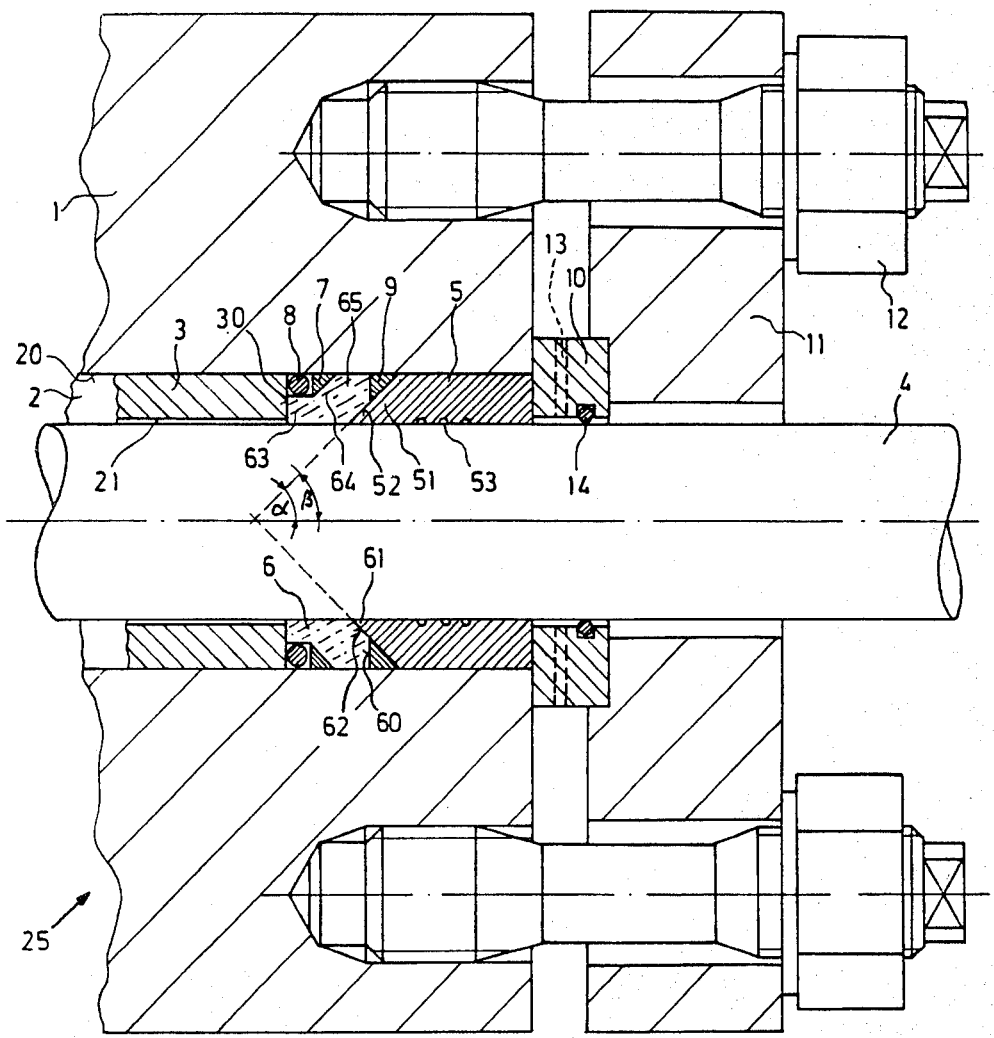
FIG. 1 is a longitudinal axial section through part of a high-pressure installation incorporating therein the sealing apparatus according to the invention.

Describing now the drawings, it is to be understood that only enough of the construction of the sealing apparatus and its related high-pressure installation has been shown as needed for those skilled in the art to readily understand the underlying principles and concepts of the present development, while simplifying the showing of the drawings. Turning attention now specifically to FIG. 1, there has been illustrated a relatively simple design of a sealing apparatus according to the invention which is suitable, for example, for use for the pressure transmitted during high-pressure fluid cutting of various articles or objects or the like. In the high-pressure cylinder 1 of the high-pressure installation 25 there is provided a cavity, specifically a bore 2 defining a pressure space or chamber into which an intermediate sleeve 3 has been inserted so as to engage the inner wall 20 of the bore 2. The intermediate sleeve 3 surrounds a plunger or shaft 4 which is mounted therein for oscillating movement and, for example, is manufactured from hard metal and advantageously has a surface roughness in the range of 0.01.

A sealing ring member 6 is arranged so as to engage the intermediate sleeve 3, and specifically, the side or end face 30 thereof which is located remote from the pressure space defined by the bore 2. At the end face 60 of the ring member 6 located remote from the pressure space or chamber there is arranged a truncated-conical recess 61 into which protrudes a truncated-conical protrusion or projection 51 of a bushing or sleeve member 5. The wall 52 of the protrusion or projection 51 engages the wall 62 of the recess 61. The bushing or sleeve member 5 simultaneously serves for mounting the plunger 4. The ring member 6 comprises a section 63 of smaller outer diameter which engages the end face 30 of the intermediate sleeve 3 and which transforms into a section 65 possessing a larger outer diameter conforming with the diameter of the bore 2 by means of a truncated-conical transitional section 64. The section 63 of smaller diameter is surrounded by a biasing or loading ring 8 which in the illustrated embodiment comprises an O-ring. The O-ring 8 subjects the ring member 6 at its reduced diameter section 63 to a force which is radially directed towards the lengthwise axis of the plunger 4, so that a good sealing action is obtained between the internal surface of the ring member 6 and the plunger 4.

A support or "chambering" ring 7 is arranged to engage the conical transitional section 64 and prevents the ring member 6 from so-to-speak creeping or moving out. There is also arranged at the annular or ring-shaped end face 60 of the ring member 6 a support ring 9 which, like the support ring 7, also has a substantially triangular cross-section. The support ring 9 substantially continues the contour of the recess or depression 61 in the annular end face 60 of the ring member 6 towards the outer or marginal edge thereof.

During the pressure stroke of the plunger or shaft 4 a pressure is built-up in the liquid medium present in the pressure space or chamber and in the small clearance or gap 21 between the plunger 4 and the internal surface of the intermediate sleeve 3 which is inserted into the bore 2 on the side of the ring member 6 which faces the pressure space or chamber. This pressure which is generated in the liquid medium exerts a force upon the ring member 6 which is axially directed away from the pressure space or chamber defined by the bore 2. The wall 62 which is configured like a truncated cone or pyramid in the recess 61 at the annular end face 60 of the ring member 6 which faces the bushing or sleeve member 5 is axially pressed against the outer surface 52 of the protrusion or projection 51 at the bushing 5 which is correspondingly shaped to the recess 61. Due to the inclined construction of the two coacting walls 62, 52 the axial force which is transmitted from the ring member 6 to the bushing 5 is partially transformed at the region of the protrusion or projection 51 into a force component which is radially inwardly directed towards the plunger 4. Due to the action of this force component the marginal region of the substantially conical or pyramid configured protrusion 51 is particularly solidly or firmly pressed against the outer surface of the plunger 4 which slides past the protrusion 51 and which is surrounded thereby. At the aforementioned marginal or edge regions of the protrusion 51 at the bushing or sleeve member 5 there are formed in this manner a type of "sealing lips" and the clearance between the internal space of the bushing 5 and the outer surface of the plunger or shaft 4 is automatically adjusted to practically zero. It may be here remarked that the recess 61 and the protrusion 51 have at least substantially the same axis as the plunger or shaft 4 or equivalent structure.

In the illustrated arrangement the bushing or sleeve member 5 additionally contains at the inner side thereof a sealing labyrinth formed by grooves 53 of, for instance, semi-circular or U-shape cross-section. Towards the exterior the bushing 5 is held in position by a pressing or pressure sleeve 10 which, in turn, is seated and arranged in a suitable holding element or holder 11. The holding element 11 is releasably connected to the high-pressure cylinder 1 and is approximately constructed like the lid of a packing gland. The pressing or pressure sleeve 10 contains an O-sealing ring 14 or equivalent structure which is arranged in a recess located at the side of the pressing sleeve 10 which faces the plunger 4. Furthermore, passages or ducts 13 for the supply of a lubricant and, if desired passages for leakage discharge are arranged in the pressing or pressure sleeve 10, whereby the wear of the plunger 4 and the bushing 5 is reduced.

Figure 2:
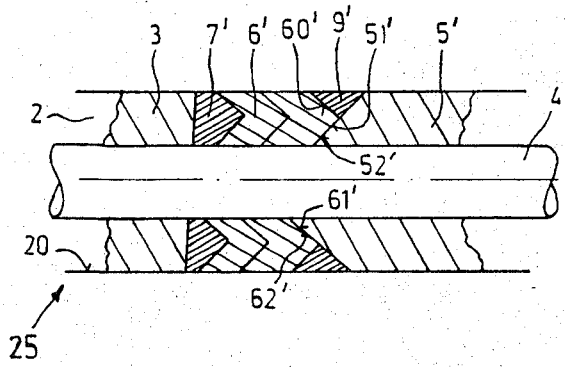
FIG. 2 is a simple sectional view illustrating a particular design of the ring member in the sealing apparatus shown in FIG. 1 which has proven to be particularly useful in practice.

The ring member 6' shown in FIG. 2 and surrounding the plunger 4 is structured like a multi-membered or multi-part sealing collar, the individual members or parts of which have a substantially V-shaped cross-section or cross-sectional configuration. The ring member 6' comprises an end having a substantially truncated-conical or truncated-pyramid shaped outer contour 60' which faces a substantially truncated-conical or truncated-pyramid shaped protrusion or projection 51' of the bushing or sleeve member 5'. Expressed in a somewhat simplified manner, the construction of this side of the ring member 6' is comparable to the rim of a crater of a volcano. The wall 62' of the recess or depression 61' in the ring member 6' and the outer surface 52' of the bushing or sleeve member 5' which protrudes into the recess 61' are in engagement with one another.

An annular or ring-shaped space is defined by the wall 20 of the bore 2 in the high-pressure installation 25 and by the substantially convex conically designed outer surfaces 52' and 60' of the protrusion 51' of the bushing 5' and the ring member 6', respectively. Advantageously, a support ring 9' of substantially triangular cross-section is arranged within this annular space and essentially fills the same.

On the side of the ring member 6' which faces the pressure space or chamber defined by the bore 2, there is arranged in this embodiment a further support ring 7' which comprises a substantially planar annular or ring-shaped surface in the direction facing the pressure space or chamber and which is configured to match the V-shape of the ring member 6' at this side.

The recess 61' at the ring member 6' and the protrusion 51' of the bushing or sleeve member 5' which protrudes into the recess 61' practically coact in the same manner while forming a highly effective, low-wear sealing action comparable to what has been already explained hereinbefore with reference to the embodiment of FIG. 1.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for sealing a high-pressure installation containing a movable member, especially an oscillatory movable plunger or a rotary shaft, with respect to a liquid medium and further including a pressure space which is to be sealed, comprising:
   a ring member having an end located remote from said pressure space;
   said ring member being provided with a recess at said end located remote from said pressure space and defining a wall;
   a bushing arranged at said end of said ring member which is located remote from said pressure space and forming a side facing said ring member;
   said side of said bushing facing said ring member comprising a protrusion which defines an outer surface;
   said protrusion possessing a substantially complementary shape to said recess at said end of said ring member; and
   said outer surface of said protrusion at least partially engaging said wall of said recess.

2. The apparatus as defined in claim 1, wherein:
   said movable member defines an axis; and
   said ring member being exposed to forces which are substantially radially directed towards said axis of said movable member.

3. The apparatus as defined in claim 2, further including:
   biasing means for exposing said ring member to said substantially radially directed forces.

4. The apparatus as defined in claim 1, wherein:
   said ring member is made of at least a plastically deformable material.

5. The apparatus as defined in claim 1, wherein:
   said ring member is made of at least an elastically deformable material.

6. The apparatus as defined in claim 1, wherein:
   said end of said ring member which is located remote from said pressure space forms an annular end face; and
   said recess is formed at said annular end face and forms a substantially truncated-conical shaped recess.

7. The apparatus as defined in claim 1, wherein:
   said end of said ring member which is located remote from said pressure space forms an annular end face; and said recess is formed at said annular end face and forms a substantially truncated-pyramid shaped recess.

8. The apparatus as defined in claim 1, wherein:
said protrusion of said bushing possesses a substantially truncated-conical shape.

9. The apparatus as defined in claim 1, wherein:
said protrusion of said bushing possesses a substantially truncated-pyramid shape.

10. The apparatus as defined in claim 1, further including:
an intermediate sleeve surrounding said movable member and seated in a bore of the high-pressure installation defining the pressure space;
the movable member extending through said intermediate sleeve;
said intermediate sleeve defining an end face located remote from said pressure space; and
said ring member defining a side facing said pressure space and said end face of said intermediate sleeve.

11. The apparatus as defined in claim 10, wherein:
said end face of said intermediate sleeve forms a substantially planar surface.

12. The apparatus as defined in claim 1, further including:
a pressing sleeve; and
said pressing sleeve positionally retaining said bushing with said protrusion protruding into said recess at said ring member.

13. The apparatus as defined in claim 12, further including:
a releasable holding element for holding said pressing sleeve.

14. The apparatus as defined in claim 12, further including:
an intermediate sleeve surrounding said movable member and seated in a bore of the high-pressure installation defining the pressure space;
the movable member extending through said intermediate sleeve;
said intermediate sleeve defining an end face located remote from said pressure space; and
said pressing sleeve being exposed to a substantially axial force directed towards said pressure space and in a direction towards said end face of said intermediate sleeve seated in said bore.

15. The apparatus as defined in claim 1, wherein:
said recess formed at said end of said ring member which is located remote from said pressure space possesses a substantially truncated-conical shape defining an apex angle;
said protrusion formed at said bushing possesses a substantially truncated-conical shape defining an apex angle; and
said apex angle defined at said recess conforming to said apex angle defined at said protrusion.

16. The apparatus as defined in claim 15, wherein:
each said apex angle lies in a range of 30° to 60°.

17. The apparatus as defined in claim 16, wherein:
each said apex angle amounts to about 45°.

18. The apparatus as defined in claim 1, wherein:
said recess formed at said end of said ring member which is located remote from said pressure space possesses a substantially truncated-conical shape defining an apex angle;
said protrusion formed at said bushing possesses a substantially truncated-conical shape defining an apex angle; and
said apex angle defined at said recess being larger than said apex angle defined at said protrusion.

19. The apparatus as defined in claim 18, wherein:
said apex angle defined at said recess is larger by an amount lying in a range of 1° to 5° than said apex angle defined at said protrusion.

20. The apparatus as defined in claim 1, wherein:
said recess formed at said end of said ring member which is located remote from said pressure space possesses a substantially truncated-pyramid shape defining an apex angle;
said protrusion formed at said bushing possesses a substantially truncated-pyramid shape defining an apex angle; and
said apex angle defined at said recess conforming to said apex angle defined at said protrusion.

21. The apparatus as defined in claim 20, wherein:
each said apex angle lies in a range of 30° to 60°.

22. The apparatus as defined in claim 21, wherein:
each said apex angle amounts to about 45°.

23. The apparatus as defined in claim 1, wherein:
said recess formed at said end of said ring member which is located remote from said pressure space possesses a substantially truncated-pyramid shape defining an apex angle;
said protrusion formed at said bushing possesses a substantially truncated-pyramid shape defining an apex angle; and
said apex angle defined at said recess being larger than said apex angle defined at said protrusion.

24. The apparatus as defined in claim 23, wherein:
said apex angle defined at said recess is larger by an amount lying in a range of 1° to 5° than said apex angle defined at said protrusion.

25. The apparatus as defined in claim 1, wherein:
said ring member is made of a synthetic material.

26. The apparatus as defined in claim 25, wherein:
said ring member is made of a tetrafluorethylene base polymer.

27. The apparatus as defined in claim 1, wherein:
said ring member has an annular end face;
a support ring arranged at said annular end face of said ring member;
said ring member defining an external contour;
said recess at said end face of said ring member defining a contour; and
said support ring being arranged and configured to continue said contour of said recess towards substantially said external contour of said ring member.

28. The apparatus as defined in claim 27, wherein:
said recess at said annular end face of said ring member defines a substantially truncated-conical contour; and
said support ring possesses a substantially triangular cross-section.

29. The apparatus as defined in claim 27, wherein:
said recess at said annular end face of said ring member defines a substantially truncated-pyramid contour; and
said support ring possesses a substantially triangular cross-section.

30. The apparatus as defined in claim 27, wherein:
said support ring comprises a metal support ring.

31. The apparatus as defined in claim 3, wherein:
said ring member defines a side facing said pressure space;

said ring member comprises a section of smaller outer diameter on said side facing said pressure space;

said biasing means forming a biasing ring; and said section of smaller outer diameter being surrounded by said biasing ring.

32. The apparatus as defined in claim 31, wherein:
said biasing ring comprises an O-ring.

33. The apparatus as defined in claim 32, wherein:
said ring member is arranged in a bore defining the pressure space and through which said movable member extends;

said ring member forming a section of larger outer diameter which substantially corresponds to the internal diameter of said bore; and said ring member comprising a transitional section between said section of smaller outer diameter and said section of larger outer diameter.

34. The apparatus as defined in claim 33, wherein:
said transitional section possesses a substantially truncated-conical shape.

35. The apparatus as defined in claim 34, wherein:
said transitional section possesses a substantially truncated-pyramid shape.

36. The apparatus as defined in claim 33, further including:
a further support ring surrounding said transitional section.

37. The apparatus as defined in claim 1, wherein:
said ring member comprises a sealing collar.

38. The apparatus as defined in claim 37, wherein:
said sealing collar comprises a multi-membered sealing collar.

39. The apparatus as defined in claim 37, wherein:
said sealing collar comprises a ring having a substantially V-shaped cross-section.

40. The apparatus as defired in claim 39, wherein:
said ring comprises a multi-membered ring.

41. The apparatus as defined in claim 37, further including:
a support ring;

said ring member defining an outer surface facing said bushing; and said support ring being arranged between said outer surface of said ring member and said outer surface of said protrusion formed at said bushing.

42. The apparatus as defined in claim 41, wherein:
said support ring comprises a multi-membered ring.

43. The apparatus as defined in claim 37, further including:
a support ring;

said ring member defines a side facing said pressure space; and said support ring being arranged on said side of said ring member facing said pressure space.

44. The apparatus as defined in claim 43, wherein:
said support ring forms a multi-membered ring.

45. The apparatus as defined in claim 37, further including:
a first support ring;

said ring member defining an outer surface facing said bushing;

said first support ring being arranged between said outer surface of said ring member and said outer surface of said protrusion formed at said bushing;

a second support ring;

said ring member defining a side facing said pressure space; and said second support ring being arranged on said side of said ring member facing said pressure space.

46. The apparatus as defined in claim 1, wherein:
said bushing is made of steel.

47. The apparatus as defined in claim 1, wherein:
said bushing is made of a copper beryllium alloy.

48. The apparatus as defined in claim 1, wherein:
said bushing has a predetermined length and an external diameter; and said predetermined length of said bushing is at least equal to said external diameter.

49. The apparatus as defined in claim 1, wherein:
said bushing defines an axis and an internal surface facing said movable member; and said bushing comprises grooves formed in said internal surface and extending substantially transversely relative to said bushing axis.

50. The apparatus as defined in claim 12, further including:
sealing means;

said pressing sleeve retaining said bushing in position and defining an internal surface facing said movable member; and said sealing means being arranged at said internal surface.

51. The apparatus as defined in claim 12, wherein:
said pressing sleeve retaining said bushing in position and defining an internal surface facing said movable member; and said pressing sleeve being provided with lubricant-supply passage opening into said internal surface.

52. The apparatus as defined in claim 51, wherein:
said pressing sleeve being provided with leakage-discharging passages opening at said internal surface.

* * * * *

UNITED STATES PATENT AND TRADEMARK OFFICE
CERTIFICATE OF CORRECTION

PATENT NO. : 4,470,607
DATED : September 11, 1984
INVENTOR(S) : WALTER SCHIER et al It is certified that error appears in the above—identified patent and that said Letters Patent is hereby corrected as shown below:

Column 2, line 66, after "bushing" please insert --or--

Column 13, line 37, please delete "defired" and insert --defined--

Column 14, line 48, please delete "passage" and insert --passages--

Signed and Sealed this

Twenty-sixth Day of February 1985

[SEAL]

Attest:

DONALD J. QUIGG

Attesting Officer

Acting Commissioner of Patents and Trademarks